Dec. 19, 1950     E. M. PERROTTA ET AL     2,534,367
LOAD CARRIER

Filed April 14, 1949     3 Sheets-Sheet 1

Inventors
Edna M. Perrotta
Gloria M. Parkrose
By Edward G. Roe
Attorney

Dec. 19, 1950 E. M. PERROTTA ET AL 2,534,367
LOAD CARRIER
Filed April 14, 1949 3 Sheets-Sheet 2

Inventors
Edna M. Perrotta
Gloria M. Parkrose
By Edward G. Poe
Attorney.

Dec. 19, 1950   E. M. PERROTTA ET AL   2,534,367
LOAD CARRIER
Filed April 14, 1949   3 Sheets-Sheet 3
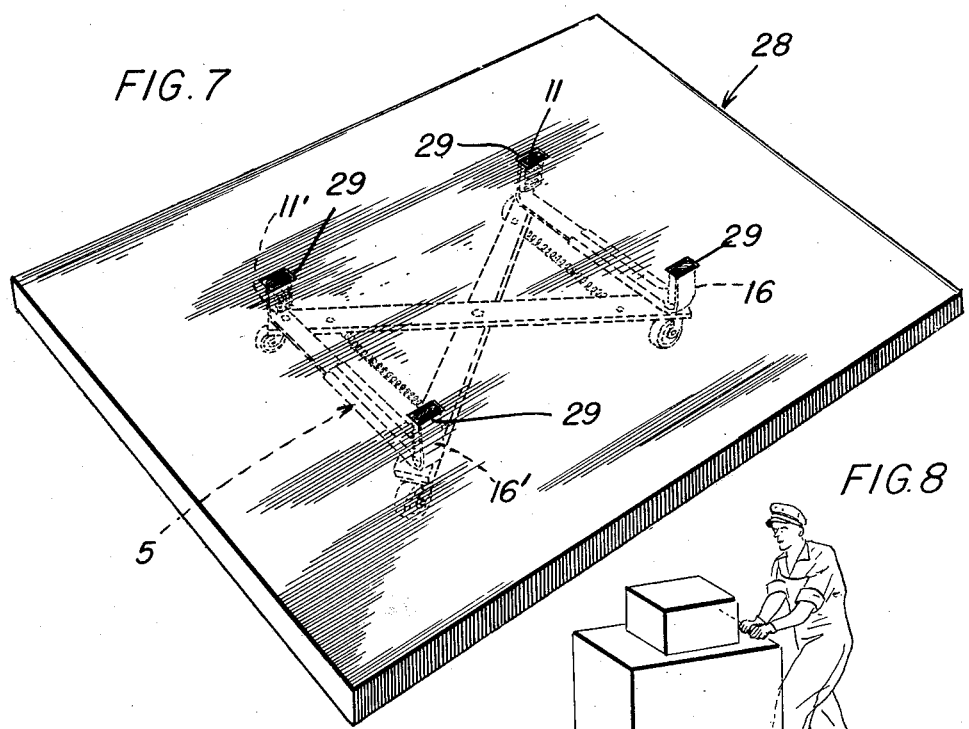
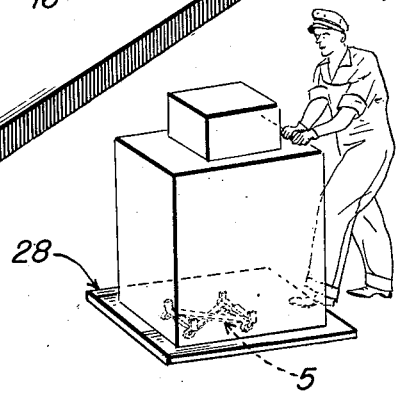
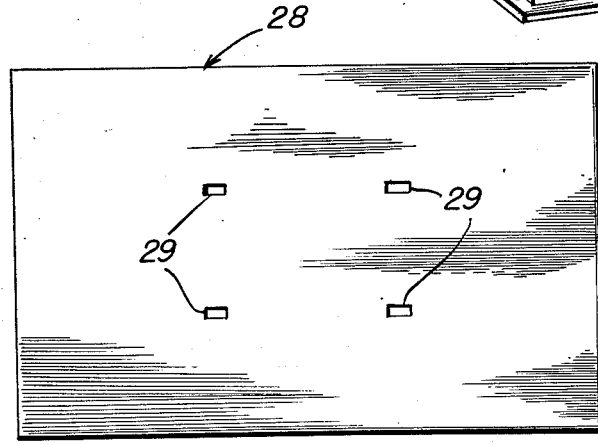
Inventors
Edna M. Perrotta
Gloria M. Parkrose
By Edward G. Roe
Attorney.

Patented Dec. 19, 1950

2,534,367

UNITED STATES PATENT OFFICE 2,534,367

LOAD CARRIER

Edna M. Perrotta, Lyndhurst, N. J., and Gloria M. Parkrose, Brooklyn, N. Y.

Application April 14, 1949, Serial No. 87,422

4 Claims. (Cl. 280—35)

In its broadest aspects, our invention pertains to a flexible load carrier which may be employed to transport luggage or any other article which can be placed on or the carrier fitted to. Hand luggage is one species of article which is adapted to be easily moved.

Traveling, whether for business or pleasure, has one inherent inconvenience—luggage must be carried, often times for extreme distances, when porters cannot be obtained, and a porter is a luxury that the large majority of the traveling public dispense with. Technological advances, for example the Diesel electric locomotive, has made possible the carrying of eighteen to twenty cars in one passenger train so that to entrain or detrain, a traveler may have to carry a weighty suit case a distance of almost a quarter of a mile. This entails a physical strain and is a trying experience under the best of circumstances. Around the home, the transporting of weighty articles is also a problem, as it is in business establishments and factories.

To eliminate carrying weighty articles we have devised a unique and highly useful mobile, adjustable and flexible carrier.

One of the principal objects is, as just stated, to obviate the back straining job of lifting and carrying luggage and other articles.

Another principal object is the provision of a load carrier which can be collapsed and stowed away in a minimum of space, i. e., a suit case.

A third object comprehends a flexible load carrier which can be adjusted with facility to varied sizes of articles and which, when adjusted and applied, will securely hold the article positioned on the carrier.

Briefly described the invention consists of a flexible skeleton platform mounted on casters, the platform comprising a pair of crossed arms, center pivoted, carrying at their outer opposite ends cooperating pivoted members with upwardly projecting cushioned flanges, the pairs of said bars adapted to be transversely movable and adjustable, one within the other. A pair of compression members for compressing the pairs of oppositely disposed cushioned flanges against the opposite sides of the luggage to be transported—are provided. The detailed description of the components of our invention, and reference to modifications thereof follows.

In the drawings:

Fig. 7 is a perspective view of the load carrier as shown in Fig. 2 as applied to a loading platform.

Fig. 8 is a view demonstrating how a load placed upon the platform, is moved.

Fig. 9 is a plan view of a platform showing position of holes by which upright flanges of load carrier are held positioned.

Figure 1:
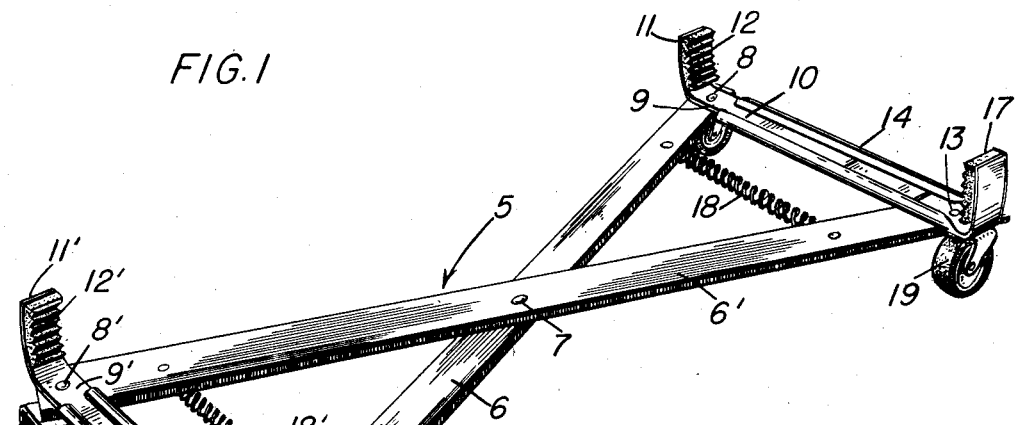
Fig. 1 is a perspective view of the load carrier in contracted position.
Figure 2:
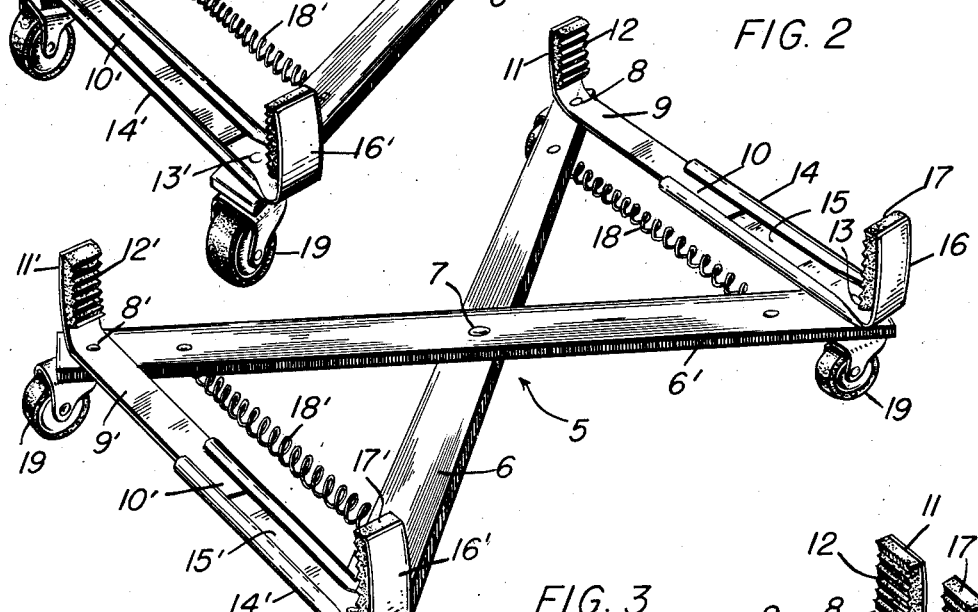
Fig. 2 is a perspective view of the load carrier in expanded position.
Figure 3:
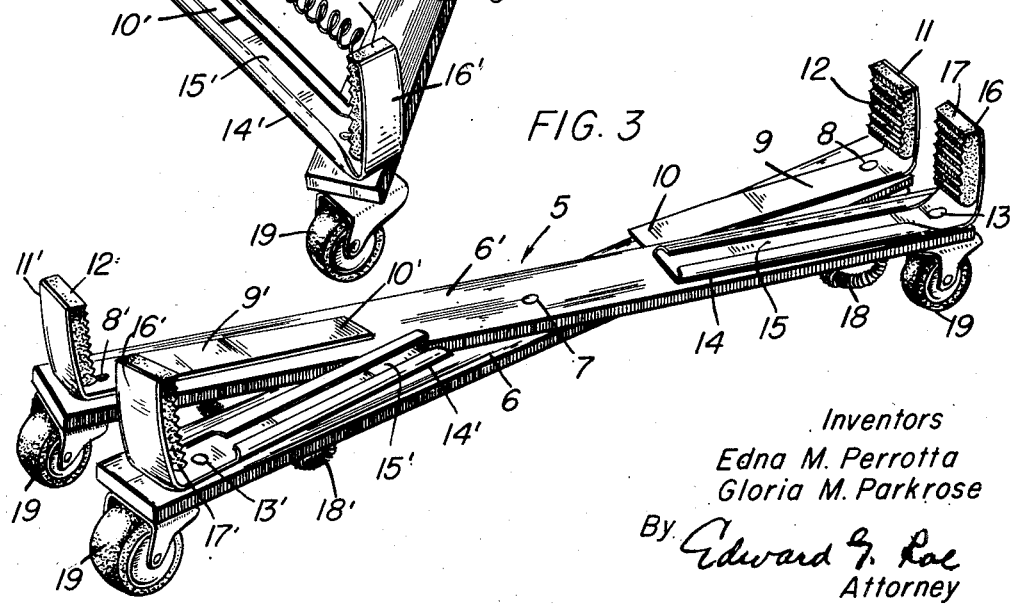
Fig. 3 is a perspective view of the load carrier in collapsed position.

In the preferred embodiment of the invention, depicted in Figs. 1, 2, 3 et al., the load carrier 5 comprises a pair of identically dimensioned intersecting cross bars 6, 6′, center pivoted as at 7, and having pivoted at one of each of their ends at 8, 8′ a pair of members 9, 9′, one part of which form laterally extending tongues 10, 10′, the other part upturned to present flanges or abutments 11, 11′ to which are affixed by any well known method, cushions 12, 12′ on their inner confronting faces.

At 13, 13′ of the other ends of cross bars 6, 6′ are pivoted members 14, 14′ designed to slidably receive tongues 10, 10′. The laterally extending portions of members 14, 14′ present rectilinear channels 15, 15′, while the other is upturned to form flanges or abutments 16, 16′ to which are also affixed cushions 17, 17′ on the inner confronting faces thereof.

Cross bars 6, 6′ and members 9, 9′, 14, 14′ may be fabricated from metals such as steel, magnesium or aluminum, while cushions 12, 12′, 17, 17′, may be made of rubber or equivalent cushioning material.

As shown in Figs. 1 and 2, tongues 10, 10′ when positioned in channels 15, 15′—are arranged in parallelism, and between cross bars 6 and 6′, and also in parallel relation, we provide compression springs 18, 18′ attached by riveting or other means to the lower portions of the bars medially the center and outer pivots. Beneath the outer extremities of the said bars are mounted casters 19, which may have rubber or other noiseless wheels.

Figure 4:
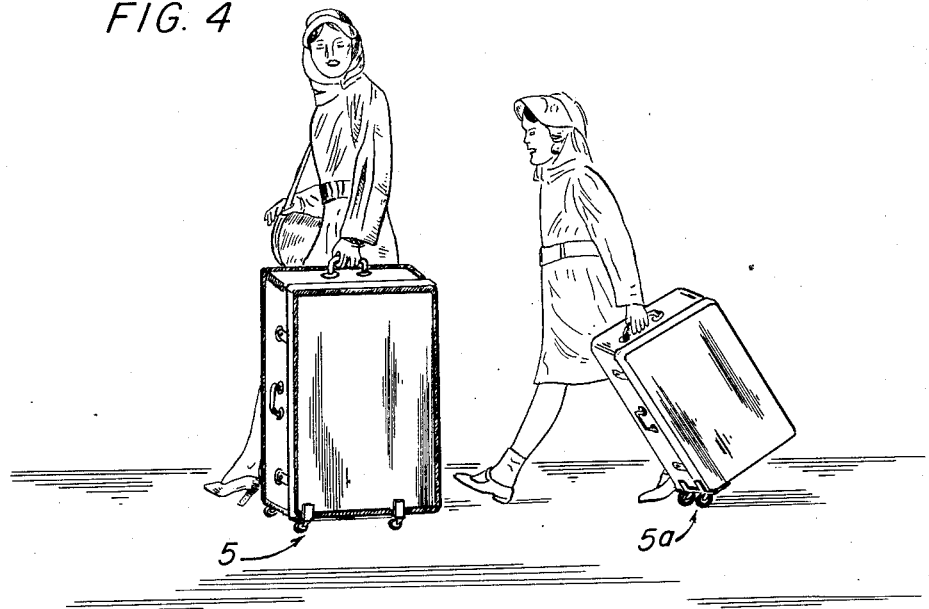
Fig. 4 is a view demonstrating one manner in which the load carrier and modified load carrier are employed.

To apply our carrier to a suit case, by way of example, it is merely necessary to place the suit case with its bottom upward, grasp two of the opposing sections of cross bars 6, 6′ medially the center pivot 7 and outer pivots, and flex said bars as with a tong sufficiently so that the inner cushioned faces of flanges 11, 11', 16, 16' grip the bottom of the suit case. The suit case may then be wheeled along the station platform with the utmost facility, with no undue strain, as shown on the left of Fig. 4.

To collapse the carrier 5, it is merely necessary to pull cross bars 6, 6' apart so that tongues 10, 10' are separably removed from rectilinear channels 14, 14', and the parts folded as illustrated in Fig. 3.

Figure 5:
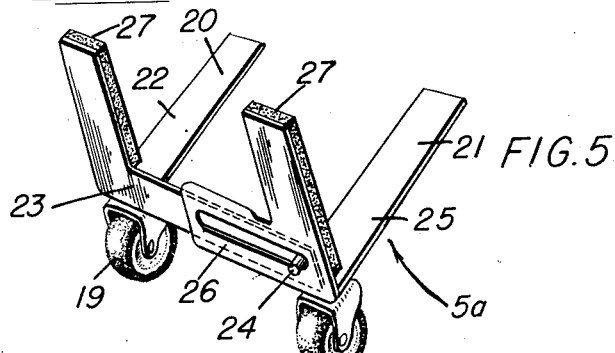
Fig. 5 shows a modified load carrier as demonstrated at the right hand of Fig. 4.
Figure 6:
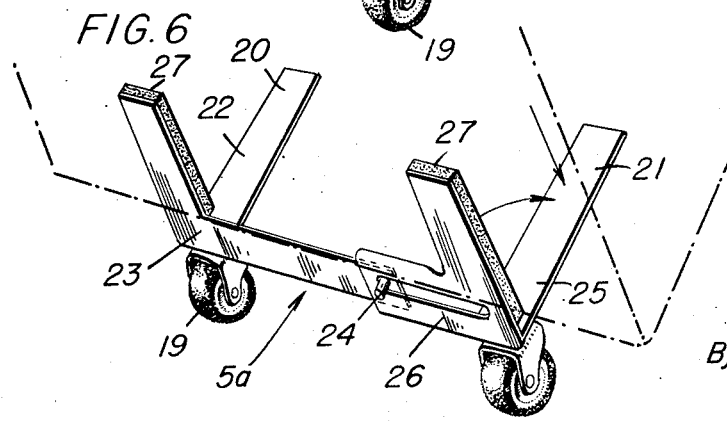
Fig. 6 shows the modified load carrier shown in Fig. 5 in extended position.

In one modification 5a, as illustrated in Figs. 5 and 6, we provide cooperating sections 20, 21, the former having right angled L frame 22 and extending tongue 23 provided with lug 24, with section 21 having a similar L frame 25 and slotted extension 26 for slidably receiving lug 24 of tongue 23. Cushions 27 may be provided on frames 22 and 25.

In this modification 5a, any weighty article placed upon the frames 22 and 25 will be held secure against displacement, as the weight applied to the one part of the frames will cause an equivalent force to be applied against the cushioned parts of the frames.

In the modification depicted in Figs. 7, 8, and 9, a platform 28 is provided with holes 29 to accommodate the cushioned flanges 11, 11', 16, 16' of carrier 5, with platform 28 being relatively thicker than the height of the said flanges. When it is desired to move packages or articles which can not conveniently be gripped by the flanges, the cross bars 6, 6' are pulled apart, and when in flexed position, as shown in Fig. 7, the flanges are fitted into holes 29, securely positioning the platform on the carrier. Articles may then be placed upon the platformed carrier and moved with facility to any desired location, as shown in Fig. 8.

Our flexible load carrier, in one particular alone, the transporting of hand luggage, is highly useful for, as referred to in the introduction, carrying said luggage is a strenuous task.

It is to be understood that while the description herein refers at times to hand luggage and suit cases, the use of the load carrier is not intended to be limited to these articles, but it is contemplated that it may be employed for any weighty item which can be fitted between the gripping flanges or placed upon the platform of the modification. It may be used to transport articles in the home, in offices, or factories and for other purposes. And furthermore, while we refer to the fabrication of certain parts from metals, we do not desire that the manufacture be limited to such materials, but may employ any suitable structural materials. Additionally, the load carrier may be made in any desired size and we contemplate that the gripping flanges may be sprung and/or swivelled.

We reserve the right to make such changes and modifications as may come within the scope of the appended claims.

We claim:

1. A load carrier comprising a pair of intersecting identically dimensioned cross bars, center pivoted, carrying casters swivelled below their opposite ends and two pairs of cooperating members pivoted thereabove and adjustably connecting the opposite ends of the bars, one pair having laterally extending tongues and upwardly extending cushioned flanges, the other pair having rectilinear channels slidably receiving the said tongues and having upwardly extending flanges, compression springs connecting the intersecting cross bars in parallelism with the pairs of cooperating members, the cross bars adapted to be flexed to adapt the confronting faces of the flanges to grip an article therebetween.

2. A load carrier for supporting and carrying articles comprising a pair of intersecting and center pivoted bars; a pair of laterally extending channeled members having abutments at one end and pivoted at said end on one end of each of the bars; a second pair of bar-like members each sliding in a corresponding channeled member and having abutments at one end and also pivoted at said end to the other end of each of said first named bars; casters swivelled below the ends of said first named bars; and means between said first named bars for compressing the opposing pairs of ends of said members and said second named bars against the opposite lower edges of an article placed on the carrier.

3. A load carrier comprising a pair of center pivoted, intersecting bars of the same length, channeled members having one upturned and cushioned end pivoted on one end of each of the bars, a pair of members pivoted on the other end of the bars adapted to be slidably received by said channeled members and also having one upturned and cushioned end, casters swivelled beneath the opposite ends of the bars; and means between the bars and in relative parallelism with the aforesaid pairs of members for lateral adjustment of the bars whereby articles of various sizes may be fitted on the cooperating pairs of members and gripped by the cushioned ends of the pairs of members.

4. A flexible load carrier for transporting luggage and other articles including a pair of relatively flat elongated intersecting bars of the same length, center pivoted on a common pivot; one pair of members having laterally extending channeled portions and upturned cushioned ends and pivoted at the latter ends on one end of each of the bars; another pair of members having laterally extending tongued portions and upturned cushioned ends and pivoted at the latter ends on one end of each of the bars, the tongued portions slidably received in and cooperating with the channeled portions of the other pair of members; casters below the ends of the bars; means between the bars for compressing the cushioned ends of the said members to grip an article placed on the cooperating members, the bars adapted to be pulled apart whereby the tongued members are separated from the channeled members and the said members folded in contiguous relation to the respective cross bars.

EDNA M. PERROTTA.
GLORIA M. PARKROSE.

REFERENCES CITED

The following references are of record in the file of this patent:

UNITED STATES PATENTS

| Number | Name | Date |
|---|---|---|
| 444,020 | Rogers et al. | Jan. 6, 1891 |
| 1,229,933 | Gahen | June 12, 1917 |
| 2,174,661 | Hope et al. | Oct. 3, 1939 |
| 2,186,368 | Conger | Jan. 9, 1940 |
| 2,345,381 | Chenette | Mar. 28, 1944 |
| 2,424,095 | Horton | July 15, 1947 |